FIG. 5
FIG. 6
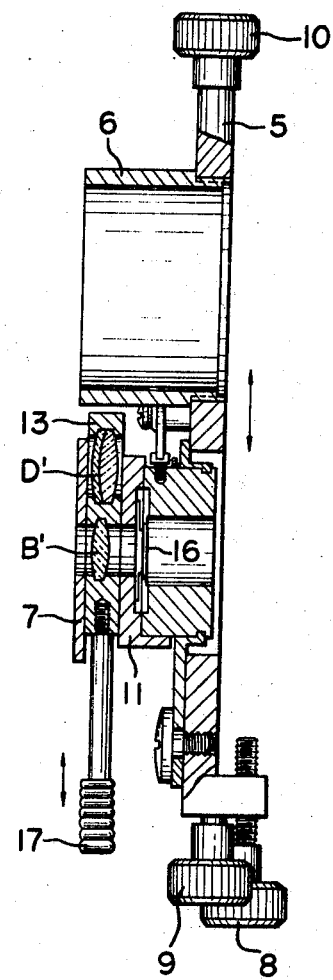
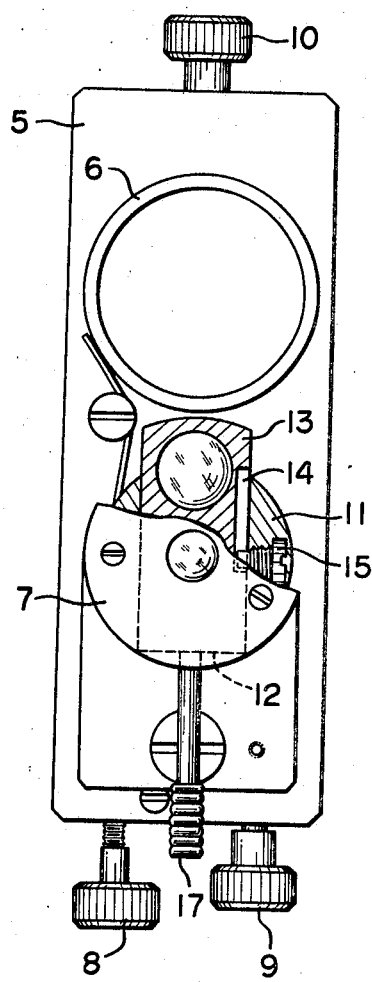

3,495,910

OPTICAL SYSTEM FOR MEASURING RETARDATION AND APPARATUS INCORPORATING THE SAME

Noboru Kuroha and Kinji Takahashi, Tokyo, Japan, assignors to Nippon Kogaku K.K., Tokyo, Japan, a corporation of Japan
Filed July 7, 1965, Ser. No. 470,023
Claims priority, application Japan, July 14, 1964,
39/55,823, 39/55,824
Int. Cl. G01b *9/02;* G01n *21/40*
U.S. Cl. 356—106   1 Claim

ABSTRACT OF THE DISCLOSURE

A polarizing microscope is provided for observing the interference fringe using a Bertrand lens and measuring the retardation in the field of view of the eyepiece without the use of a special eyepiece.

---

This invention relates to an optical system for measuring retardation and apparatus for measuring retardation applicable to polarizing microscopes.

In apparatus such as, for example, a polarizing microscope, which measures and observes the optical properties of substances with the aid of polarized light using a polarizer and an analyser, there is inserted a so-called Bertrand's lens whereby the interference fringe formed in the back focal plane is observed. In an apparatus for measuring retardation of substances to be determined, a compensator, such as Babinet or of wedge-like quartz, is used.

One prior art apparatus for continuously changing the retardation with the aid of a compensator provides for the movement of one of two wedges with respect to the other parallel to the direction of the angle of wedge, and for the reading of the amount of this movement by a micrometer having a fine screw and a drum scale. It is necessary however, to read a drum scale separate from and outside the field of view of the optical system used in observing and adjusting the contrast of the field and the variation of the fringe patterns. This results in a complicated measuring operation, causing eye fatigue; the observations thus made leading to inaccurate measurements due to mechanical errors and changes in atmospheric temperature.

One of the objects of this invention is to provide an optical system wherein the amount of the movement of the wedge is observed in the field of view and read directly.

Another object of this invention is to provide a retardation measuring apparatus having an additional lens interchangeable with a Bertrand's lens, or insertable in an optical path together with the Bertrand's lens, for enabling reading, in the field of the microscope, of the scale directly engraved on the surface of the movable wedge.

The foregoing objects and the advantages will be readily understood from the following description referring to the accompanying drawing, in which.

Figure 4:
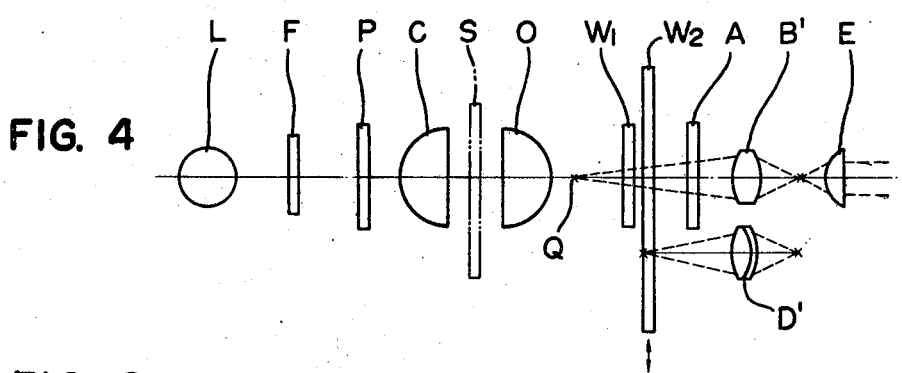

FIG. 4 is a diagrammatic view showing a modification of the optical system of this invention as applied to a polarizing microscope in which an additional lens is insertable within the light path; and FIGS. 5 and 6 show a structure for interchanging the Bertrand's lens and an additional lens with each other in accordance with the invention, with FIG. 5 showing a sectional view and FIG. 6 showing a plan view.

Figure 1:
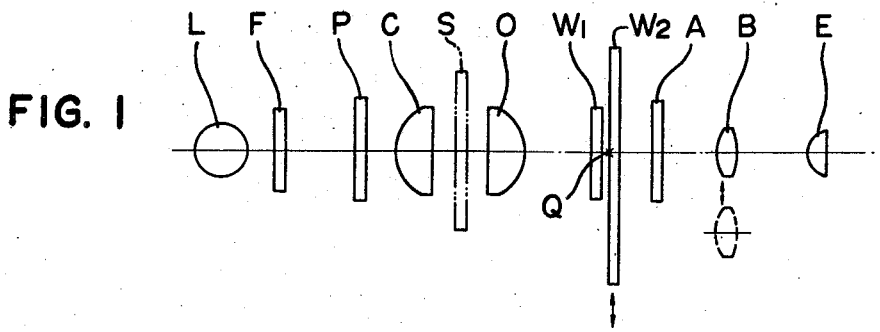
FIG. 1 is a diagrammatic view showing an optical system according to this invention.

Referring to FIG. 1, L is a light source, F a filter for monochromatic light, P a polarizer, C a condenser lens, S a body to be observed, O an objective, A an analyser, and E an eyepiece. The aforesaid optical array is the same as in a conventional polarizing microscope. However, elements $W_1$ and $W_2$ constitute compensators which according to this invention, are inserted on the light axis between body S to be observed and analyser A. Element B is an additional lens acting as an objective and constituting, together with eye-piece E, the microscope optical system which focuses between compensators $W_1$ and $W_2$.

Figure 2:
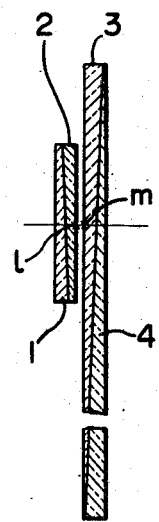
FIG. 2 is a sectional view of the wedge plates used in this invention.
Figure 3:
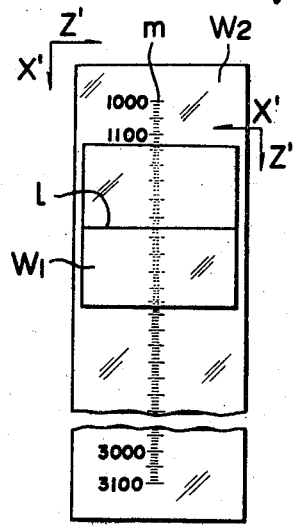
FIG. 3 is a side view of the wedge plates of FIG. 2 as viewed from the left.

FIG. 2 shows the structure of compensators $W_1$ and $W_2$ in which 1 and 4 are thin wedge plates made of uniaxial optical substance, having their optical axes at 90° to each other as shown in FIG. 3 by arrows X' and Z'. Each optical axis is parallel to a side surface of the plate, each plate having the same small apex angle. Elements 2 and 3 are glass plates having the same wedge angle as that of the wedge plates 1 and 4, the wedge plate 1 being cemented to the glass plate 2 so that the outer surfaces of the compensator are together parallel. Plates 3 and 4 are similarly cemented to each other.

Compensators $W_1$ and $W_2$ of FIG. 1 correspond to plates 1, 2 and 3, 4, respectively, of FIG. 2, and compensators $W_1$ and $W_2$ are positioned face to face spaced a small distance from each other. Compensator $W_1$ is fixed while compensator $W_2$, an oblong plate, is precisely movable, with the aid of a fine adjustment screw, in the direction of the two-headed arrow shown in FIG. 1.

An index mark or hairline is engraved on the rear surface of compensator $W_1$ while a retardation scale $m$ is engraved on the front surface of plate $W_2$. By providing a vernier scale in place of the indicating line $l$, a more precise reading of the scale can be attained. The difference between the thicknesses of the wedge plates 1 and 4 when measured within the field of view and parallel to the optical axis is kept constant, the degree of darkness or brightness being observable uniformly throughout the field, the contrast of darkness or brightness being changed when the compensator $W_2$ is moved. The amount of the movement of compensator $W_2$ is simultaneously measured by reading the coincidence of the line $l$ and the retardation scale $m$ through an additional lens B and an eyepiece E. When the compensator $W_1$ is rotated by 180° within a plane perpendicular to the optical axis, the difference of the thicknesses between wedge plates 1 and 4 measured along the optical axis is not constant. Under this condition, not the contrast but the fringe pattern is observable in the field, and when the compensator $W_2$ is moved, the fringe pattern is varied.

In operation, the wedge plates $W_1$ and $W_2$ and the lens B are first moved out of the optical system, and after setting the polarizer P and the analyzer A as crossed Nicol prisms, the body S is moved into the optical system. Thereafter the eyepiece E is focussed on the portion to be measured, the body S being rotated by means not illustrated so that the body is first in the extinction position and thereafter in the diagonal position. The compensators $W_1$ and $W_2$ are then inserted into the light path and the compensator $W^2$ is slidably moved to seek the position at which the portion to be measured is observed as the darkest portion. Lens B is then inserted into the light path to read the scale on the compensator $W_2$, the determining action of the retardation being obtained by comparing the reading with prepared table. In this embodiment of the invention, the linear scale is engraved on the movable wedge plate and this scale is directly read through the additional lens and the eye-piece. As a result, the operation is easily made without any mechanical errors, and does not cause eye fatigue as in prior art devices.

FIG. 4 shows a modification of the inventive optical system, in which the elements which essentially correspond to those shown in FIG. 1 are designated with the same reference numerals. The compensators $W_1$ and $W_2$ in this embodiment are the same as shown in FIG. 2. In FIG. 4, an additional lens B' is the Bertrand's lens for observing the interference fringe formed on the upper focal plane of the objective and the element D' is another additional lens for reading the retardation scale and being interchanged with Bertrand's lens B', or inserted in the vicinity of Bertrand's lens, in the optical path to change their compound focal distance to observe the scale on movable compensator $W_2$. Element B' is insertable within the light path for observing the interference image which is formed at the back focal plane Q of objective O. If the device has already been arranged to place a test plate, i.e., a ¼λ plate, for examining the weak double refraction, then compensators $W_1$ and $W_2$ are inserted at this position instead of the test plate. Lens D' is a magnifying lens for reading the vernier scale m, the lens having a shorter focal length than the Bertrand lens B'. It will be apparent that the lens D' can be inserted with the lens B' instead of interchanging the two lenses.

FIGS. 5 and 6 show an embodiment of the structure for interchanging lenses B and D according to this invention. Element 5 is a slidable plate, 6 a hollow cylinder, 7 an additional lens barrel, 8 a limited adjusting screw, 9 a knob for adjusting lateral movement of additional lens barrel 7, 10 a knob for limiting the sliding movement of plate 5, knob 10 being similar to that used in conventional devices for inserting or removing the Bertrand's lens in or from the light path. Element 11 is a lens supporting barrel which can be rotated about the axis of the barrel. Barrel 11 is provided with longitudinal channel 12 extending through its upper portion within whch lens frame plate 13 is slidably inserted. A threaded pin 15 is threaded into a key-channel 14 formed in plate 13 forming a stop for the movement of plate 13 in the direction of the two-headed arrow in FIG. 5 to insure that the centers of Bertrand's lens B and additional lens D can be coincident with the centre of an iris 16 provided at the center of additional lens barrel 7, respectively. Handle 17 is used to slide plate 13 in the direction of the two-headed arrow and to rotate plate 13 about barrel 11 for adjusting aperture size of iris 16.

With the structure so described, the interference image of the body to be examined is the same as in conventional polarizing microscopes, a Bertrand's lens B' is placed on barrel 11 and slidable plate 5 is moved upwardly until it is stopped by screw 8, and compensator plates $W_1$ and $W_2$ are removed from the light path. When it is desired to measure retardation, additional lens D' is interchanged with Bertrand's lens B' by moving handle 17 downwardly, slidable plate 5 being thereafter moved downwardly so that hollow cylinder 6 is inserted into the light path, and the body to be examined is placed at its position in the light path after polarizer P and analyser S are positioned in crossed Nicol prism condition. After focussing on the portion of the body to be examined, the rotational stand is rotated initially to the extinction position and then to the diagonal position. The compensators $W_1$ and $W_2$ are then inserted into the light path and the compensator $W_2$ is slidably moved to find the location at which the body portion to be measured is observed as the darkest portion. Then slidable plate 5 is moved upwardly to insert additional lens D' into the light path to directly read the scale which is enlarged by additional lens D' and eye-piece E. When the scale is read, the retardation will be determined in accordance with the prepared table.

As aforementioned, in a modified embodiment, Bertrand's lens B' is fixedly provided within supporting barrel 11, and additional lens D', when it is moved to be inserted into the light path by handle 17, faces Bertrand's lens B'.

What is claimed is:
1. A device for measuring retardation applicable to a polarizing microscope comprising, in combination an optical system having
   a source of illumination,
   a filter for monochromatic light,
   a condenser and an objective each employing refractive components and being disposed on the optical axis of the system, the condenser and objective being spaced apart and disposed on opposite sides of a predetermined object plane of the system,
   a polarizer and an analyzer in optical crossed relationship in the optical system, the polarizer receiving the light from said source and directing a polarized light beam toward the condenser and the object plane for illuminating the object in the object plane, the objective being arranged to focus at the object plane to form an image thereof at an image plane conjugate thereto and to form the interference fringe in the back focal plane thereof,
   an eyepiece for observing the image of the object,
   compensating means being provided between the back focal plane of said objective and said eyepiece comprising two thin wedge plates, each of which consists of a uniaxial optical substance having the same small wedge, the optical axis of said wedge plates being at 90° to each other, one wedge plate being fixed while the other is movable parallel thereto to change the retardation, a retardation scale being provided on a surface of the movable wedge plate,
   an additional optical means having two lenses, each of which has a different focal length and is located respectively between said compensating means and said eyepiece, one lens being arranged to focus at said back focal plane of said objective while forming an image of said interference fringe at said image plane of said objective conjugate thereto, the other lens being interchangeable therewith to focus at said retardation scale while forming an image thereof at said image plane of said object conjugate thereto, and operable means having
   a slidable plate having two openings and movable to position the axes of the openings in alignment with said optical axis,
   a hollow cylinder inserted into one of said openings, the light rays of the image of the object passing through said hollow cylinder when it is positioned on said optical axis,
   a lens frame plate carrying the two additonal lenses,
   a barrel in the other of said openings slidably supporting said lens frame plate for interchanging the two lenses, the barrel having an iris stop and being rotatable about the axis of the barrel for varying the operture of said stop,
   a first knob projecting longitudinally of said slidable plate for sliding the same, and a second knob projecting longitudinally of said lens frame plate for sliding and rotating the same.

References Cited
UNITED STATES PATENTS
| | | | |
|---|---|---|---|
| 1,851,912 | 3/1932 | Kingston | 350—254 |
| 2,460,515 | 2/1949 | Lowber et al. | |
| 2,503,808 | 4/1950 | Earl et al. | |
| 1,383,678 | 7/1921 | Tillyer et al. | 88—56 |

OTHER REFERENCES

Manual of the Polarizing Microscope, by Hallimond, 1953, QH217H3, pp. 60–65.

Crystals and the Polarizing Microscope, Hartshorne and Stuart, 1960, QD941H3, pp. 173–179.

Spencer Polarizing Microscopes, 1941, QH219S746, pp. 8–9.

Conn G. K. T., et al., Polarized Light in Metallography, Butterworths Scientific Publications, London, 1952, pp. 20–21, TN690C58C.2.

RONALD L. WIBERT, Primary Examiner

J. ROTHENBERG, Assistant Examiner

U.S. Cl. X.R.

350—12, 254, 44, 39, 15; 356—115